United States Patent
Mae et al.

(10) Patent No.: US 7,590,379 B2
(45) Date of Patent: Sep. 15, 2009

(54) IMAGE FORMATION DEVICE

(75) Inventors: Toshiyuki Mae, Tokyo (JP); Masaaki Yoshikawa, Kawasaki (JP)

(73) Assignee: Ricoh Company, Ltd., Tokyo (JP)

(*) Notice: Subject to any disclaimer, the term of this patent is extended or adjusted under 35 U.S.C. 154(b) by 638 days.

(21) Appl. No.: 11/079,473

(22) Filed: Mar. 15, 2005

(65) Prior Publication Data
US 2005/0200674 A1 Sep. 15, 2005

(30) Foreign Application Priority Data
Mar. 15, 2004 (JP) .............................. 2004-072872

(51) Int. Cl.
G03G 15/00 (2006.01)
G03G 21/00 (2006.01)
B41J 29/00 (2006.01)

(52) U.S. Cl. .................. 399/405; 399/107; 399/126; 399/361

(58) Field of Classification Search ............. 399/107, 399/126, 361, 363, 381, 383, 405; 347/104; G03G 15/00, G03G 21/00; B41J 29/00, 29/02, 29/04
See application file for complete search history.

(56) References Cited

U.S. PATENT DOCUMENTS 5,848,328 A * 12/1998 Ueda et al. ............... 399/107
5,920,758 A * 7/1999 Ohtsuki .................... 399/405
6,698,138 B1 * 3/2004 Lin ............................. 49/409
7,050,204 B1 * 5/2006 Sato et al. .................. 358/471
7,298,979 B2 * 11/2007 Kitozaki ........................ 399/7

FOREIGN PATENT DOCUMENTS

| JP | 05207210 | A | * | 8/1993 |
|---|---|---|---|---|
| JP | 11164076 | A | * | 6/1999 |
| JP | 2000221746 | A | * | 8/2000 |
| JP | 2001022143 | A | * | 1/2001 |
| JP | 2001072259 | A | * | 3/2001 |
| JP | 2001-238014 | | | 8/2001 |
| JP | 2002156887 | A | * | 5/2002 |
| JP | 2002323802 | A | * | 11/2002 |
| JP | 2003-241460 | | | 8/2003 |
| JP | 2003241460 | A | * | 8/2003 |
| JP | 2003-280307 | | | 10/2003 |
| JP | 2003283727 | A | * | 10/2003 |
| JP | 2004020582 | A | * | 1/2004 |

* cited by examiner

Primary Examiner—Judy Nguyen
Assistant Examiner—'Wyn' Q Ha
(74) Attorney, Agent, or Firm—Harness, Dickey & Pierce, P.L.C

(57) ABSTRACT

A safe and space-saving image formation device that reduces, with a simpler configuration, generation of abnormal images by blockage, skewing, etc. by the document image reading device, that has an interior of the internal paper ejection unit with a larger space, has satisfactory operability for removing the recording medium, has improved maintenance characteristics, for example, unit replacement and adjustment, and/or that has improved external product quality.

3 Claims, 12 Drawing Sheets

X<Y

IMAGE FORMATION DEVICE

PRIORITY STATEMENT

The present application claims priority of Japanese Patent Application No. 2004-072872 filed in the Japanese Patent Office on Mar. 15, 2004 the entire contents of which are hereby incorporated herein by reference.

BACKGROUND

Recently, the majority of image formation devices have adopted a space-saving configuration that provides an empty internal paper ejection unit that ejects a recording medium, on which the image has been formed, for example, recording paper, transfer paper, card stock or overhead projector (OHP) film, between a document image reading device and an image formation unit arranged below that document image reading device.

In this type of image formation device, a printer unit and a scanner unit may be connected by a rigid arm so that the distance between may be modified; and the rigid arm may be covered by an exterior cover. In this type of image formation device, when the setting of the paper ejection tray of the internal paper ejection unit is increased according to the desire of the user, a well-known technology to maintain an attractive appearance when widening the distance between units is to use a supplemental cover so that there is no gap between the covers.

When a space-saving image formation device is provided with an internal paper ejection unit, the total height of the device may increase and the position of the center of gravity may also become higher because the scanner is positioned in the upper part, and therefore a feeling of instability, when lifting is increased. If a color image formation device is provided with an internal paper ejection space, the weight of the device may also increase, and therefore this feeling of instability may increase further.

Also well known is the fact that a handle for lifting the image formation device, which may comprise an internal paper ejection unit and an image reading unit above the image creation unit, may be provided above the image creation unit of the main body of the device to improve the safety and the handling characteristics of the device.

Also well known in a space-saving image formation device provided with an internal paper ejection unit is the fact that the document reading unit may comprise a scanner unit for reading the document image, and a top plate for mounting the said scanner unit on a support forming the internal paper ejection unit. The operation of attaching the document reading unit above the image formation unit may be simplified so that the said top plate and the aforementioned support are secured by fastening members, for example, machine screws or screws that screw into the upper surface of the aforementioned support through the said top plate; and the aforementioned top plate and the said scanner are secured by fastening members, for example, machine screws or screws that screw into the lower surface of the said scanner unit through the said top plate from the internal paper ejection unit side.

Further, also well known in a space-saving image formation device provided with an internal paper ejection unit is the fact that printer units may be shared with other model types and a decrease in operability in the production line can be prevented by dividing the rear plate, which is a strengthening member comprising the frame of the device, into separate parts of an image creation rear plate, and a rear plate of the image reading unit and the paper ejection unit.

The document reading unit of a conventional space-saving image formation device provided with an internal paper ejection unit may be open at the right front or left front side and may consequently be supported at three points taking into account the operation of removing the recording medium, for example, recording paper, transfer paper, card stock or OHP film that is in the internal paper ejection unit.

In this way, because the ejection unit of the internal paper ejection unit may be positioned directly below the document image reading device, and the image writing unit may be positioned above the image creating unit, in a conventional space-saving image formation device provided with an internal paper ejection unit access to positions below the document reading device, for example, the recording medium ejection unit to the internal paper ejection unit and the image writing unit may be blocked by the document image reading device and access may be made difficult, the maintenance characteristics may be poor, there is the danger that if an automatic document feeder (ADF) is added, the weight may increase, the load on the operator may be augmented, and/or accidents may occur by dropping or tipping over, and/or replacement of the document image reading unit itself may be difficult and handling may not be simple.

For example, with a conventional space-saving image formation device provided with an internal paper ejection unit wherein the document image reading device is mounted on top of the paper ejection unit that ejects the recording medium onto which toner images have been transferred and affixed by an electrophotographic method, the right front or left front side below the document image reading device may be generally left open considering the handling of the recording media that have been ejected.

Normally, a document image reading device is supported by four sides, but in the aforementioned conventional space-saving image formation device provided with an internal paper ejection unit, three locations may be sufficiently supported in a sturdy structural unit, but the one that is open on the right front or left front side below the document image reading device may not have a sufficiently strong structure compared to the other three support parts, and because the multiplication of part tolerances may be larger, fluctuations may occur and abnormal images, caused by skewing may occur.

As a result, the one open location may be adjusted to match the distortion of the image by providing an adjustment member that can be finely adjusted vertically, or a spacer with a thickness that can be modified.

Further, in order to make the adjustment width of the adjustment member smaller, the open location may be supported by a sturdier structural unit. Configuring the structural unit supporting the open part may be difficult if desiring to use the space below the document image reading device for stacking more recording medium because the ejection unit of the recording medium is used below the document image reading device. Further, the exterior cover that covers the structural unit used on the side surfaces of the document image reading device also may be secured to a structural unit that has sufficient strength for maintaining safety. In order to support the exterior product quality including the gaps and stage differences, etc. of the exterior covers, the positional relationships of the other covers attached to the document image reading device, the operating panel, and the contact glass may be fixed.

However, although the height of this kind of conventional document image reading device of an image formation device may be moved in order to adjust for distortions, because the structural unit that secures the exterior cover is immobile, the positional relationships with the document image reading device may collapse when securing the exterior cover to the structural unit, and the exterior cover may interfere with the frame and contact glass of the document image reading device, impeding assembly. Abnormal or unsatisfactory images may be produced by the exterior cover pressing against the document image reading device and distortions may be produced by the document image reading device; and disadvantages may occur, for example, gaps or stage differences between the other exterior covers or the operating panel.

A conventional solution may include making the screw hole of the exterior cover a long hole, and using screws to secure the structural unit. This kind of conventional long hole of the exterior cover may be of a size equivalent or greater to an adjustment range of the adjustment member, which may result in an undesirable deterioration of the exterior product quality.

In addition, because screws may be used to secure this kind of convention exterior cover to the immobile structural unit, this exterior cover must first be removed when adjusting the adjustment member, which may increase operating time.

Further, the adjustment position may be set to correspond to a fixed adjustment position in all image formation devices at the time of assembly in order to pre-inspect for fluctuations and to shorten the operating time, and therefore the adjustment position may not be suitable for every device.

Further, if a drive device, for example, a motor, and a detector to detect the position are provided, the user may adjust the adjustment position of the document image reading device by manual input from the operating panel based on feedback of the output values of the document image reading device and the image formation device. However, in a conventional configuration of an image formation device, because the exterior cover is fixed to an immobile structural unit, the position of the document image reading device may not be adjusted in a straightforward manner. Position adjustment by the user from the operating panel may not be practical because removal of the exterior cover is presupposed, and thus adjusting the position of the document image reading device may be more complicated.

In this kind of conventional image formation device, access to positions below the document reading device, for example, the recording medium ejection unit to the internal paper ejection unit and the image writing unit may be blocked by the document image reading device and access may be made more difficult, the maintenance characteristics may be poorer, there may be a danger that if an automatic document feeder (ADF) is added, the weight will increase, the load on the operator may be augmented, and accidents may occur by dropping or tipping over; replacement of the document image reading unit itself may be more difficult and handling may not be as simple, the open part of the internal paper ejection unit may not have a sufficiently strong structure, fluctuations may occur and abnormal images may be produced due to skewing because part tolerances may be larger, and/or the configuration may not be suitable if it is desired to use the space below the document image reading device for stacking more recording medium. Other disadvantages may include not being able to assemble the exterior cover, abnormal images and large stage differences may be generated by twisting, etc., exterior product quality may deteriorate, and/or the operation of adjusting the position may become difficult leading to increased operating time.

SUMMARY

Example embodiments of the present invention may relate to an image formation device, and more particularly to an image formation device, for example, an ink jet printer or other printing devices that form an image such that a recording medium, for example, recording paper, transfer paper, card stock or OHP film on which an image has been formed, is ejected between a document image reading device and an image formation unit arranged below, or a copier, facsimile device, printer, or combinations of devices that form toner images by repeating such processes as electric charging, writing, developing, transferring and cleaning based on an electrophotographic method.

Example embodiments of the present invention may resolve one or more of the problems discussed above. Example embodiments of the present invention may use a simple configuration to reduce blockage by the document image reading device and generation of abnormal images by skewing, etc. and/or provide a safe and space-saving image formation device that has a large space inside the internal paper ejection unit, has satisfactory recording medium removal operability, and/or has improved exterior product quality and maintenance characteristics, for example, unit replacement and adjustment.

Additional features and advantages of one or more example embodiments of the present invention will be more fully apparent from the following detailed description of example embodiments, the accompanying drawings and the associated claims.

BRIEF DESCRIPTION OF THE DRAWINGS

Example embodiments of the present invention will become more apparent from the following detailed description taken with the accompanying drawings in which.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF THE EXAMPLE EMBODIMENTS

Embodiments of the present invention will be explained in detail below by referring to the diagrams.

Figure 1:
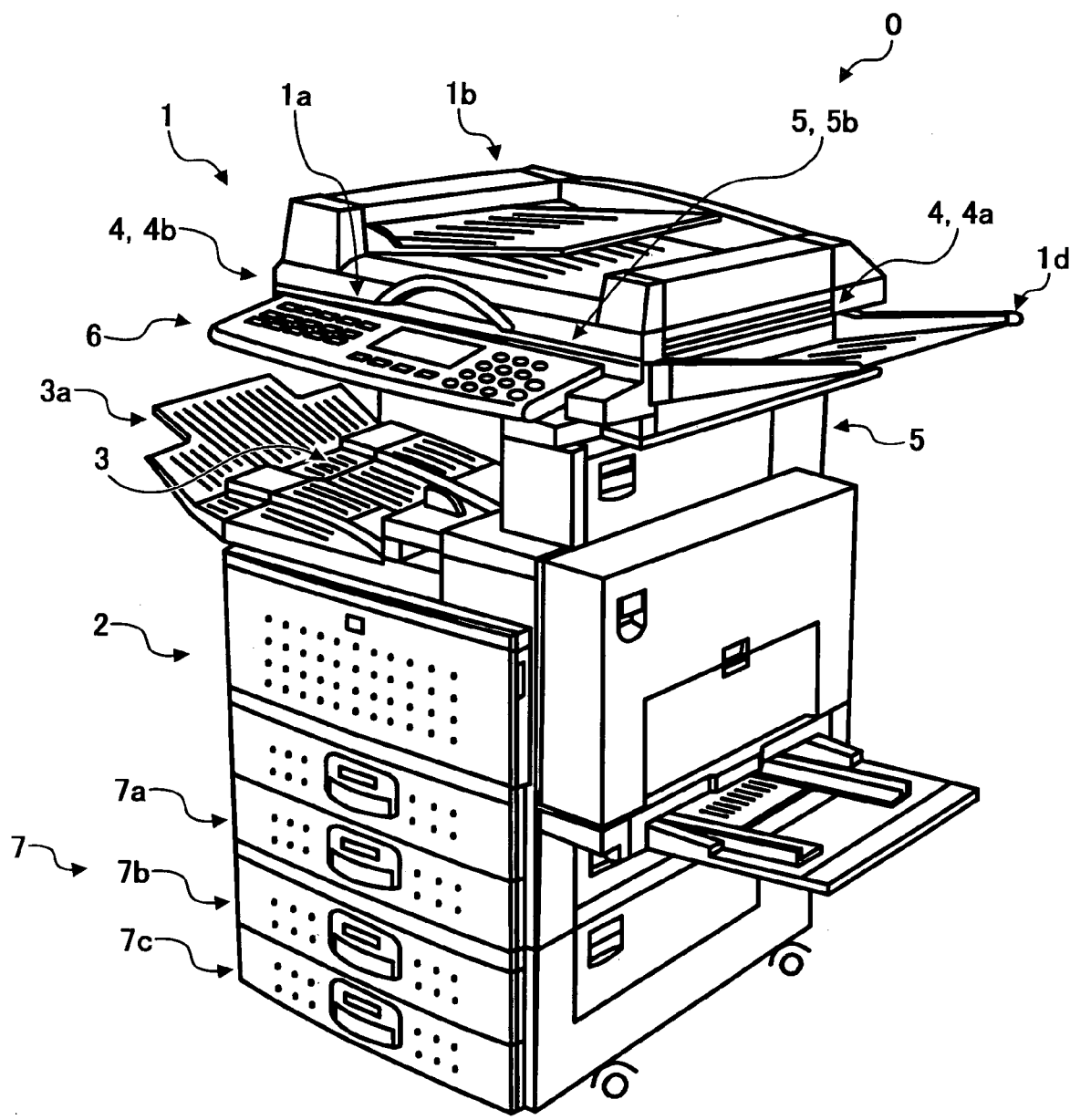
FIG. 1 is an angle view diagram indicating the exterior appearance of an image formation device related to an example embodiment of the present invention.
Figure 2:
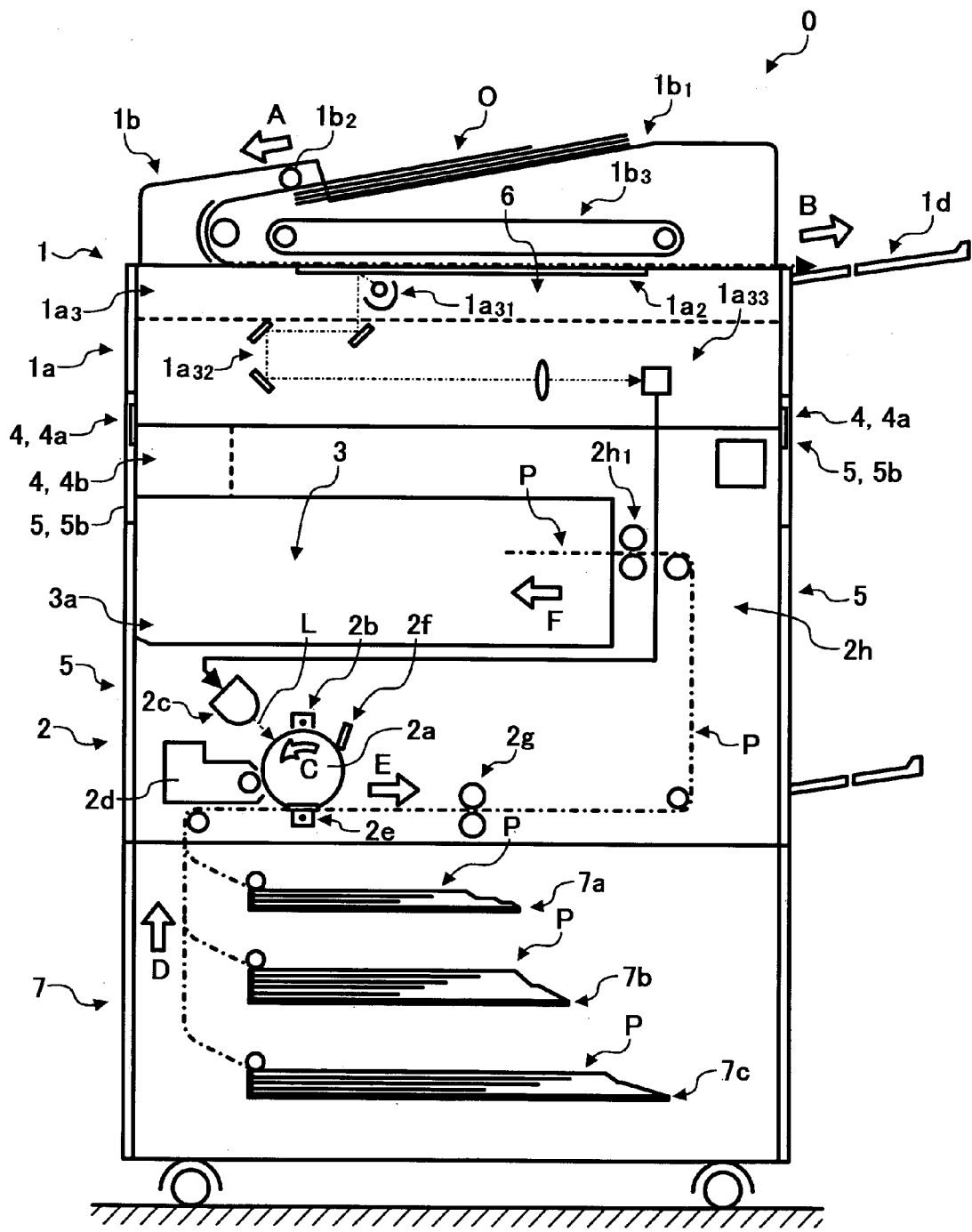
FIG. 2 is a diagram indicating the configuration of an image formation device related to an example embodiment of the present invention.

In FIG. 1 and FIG. 2, an image formation device 0, which forms an image such that the recording medium on which the image is formed may be ejected between a document image reading device and an image formation unit arranged below may include a document image reading device 1 that reads document images; an image formation unit 2, arranged below the aforementioned document image reading device 1, and forms images on recording media P, for example, recording paper, transfer paper, card stock, and OHP film, an internal paper ejection unit 3 by which recording medium P, on which images have been formed by the image formation unit 2, is ejected between the document image reading device 1 and the image formation unit 2, an opening part 3a on the right front or left front side, not indicated in the diagram, of the internal paper ejection unit 3, and opening part 4a and a support position adjustment part 4b of movable support 4 that may support the document image reading device 1 on the side surface of the document image reading device 1 in a manner movable to a desired position by a plurality of support parts that support the document image reading device 1 on the upper part of the internal paper ejection device 3 having the opening part 3a. A simpler configuration may be used to reduce blockage of the position below the document image reading device 1 by the document image reading device 1 and generation of abnormal images by skewing, etc. based on the document image reading device 1 having a configuration insufficiently strong at the opening part 3a of the internal paper ejection unit 3 compared to the other three support parts. A space-saving image formation device may have an interior paper ejection unit 3 with a larger interior, has satisfactory recording medium P removal operability, improves supply replacement characteristics, for example, toner cartridges not indicated in the diagram, and/or may have improved maintenance characteristics, for example, unit replacement and adjustment.

The digital copying device of the image formation device 0 may include a document image reading device 1, which reads the document image of document O; an image formation unit 2, which may be arranged below the document image reading device 1 and may forms a toner image by an electrophotographic method; and a paper supply cassette 7a, a paper supply cassette 7b, and a paper supply cassette 7c of a paper supply device 7 mounted with the image formation unit 2. The internal paper ejection unit 3, wherein the recording medium P on which toner images are formed by the image formation unit 2 by an electrophotographic method and are ejected and stacked, may be arranged between the image formation unit 2 and the document image reading device 1, and therefore the set up area may be reduced and space is saved, and higher quality toner images may be formed at high speed.

The document image reading device 1 may include a document image reading device main body 1a, an automatic document feeder (ADF) 1b, and a document tray 1d that stacks the document O sent from the aforementioned automatic document feeder (ADF) 1b. An operating panel 6 may be arranged and secured in a single unit at the front on the operating side, and the support position adjustment part 4b may be manipulated by an operating member, not indicated in the diagram, of the operating panel 6. At least one of the support positions where the document image reading device 1 is supported may be easily adjusted by the support position adjustment part 4b.

As indicated in FIG. 2, the document O may be mounted on a document stand $1b_1$ of the automatic document feeder (ADF) 1b, and when the print key, not indicated in the diagram, is pressed, the top page of the document O may be fed in the direction of the arrow (A) indicated in FIG. 2 by the rotation of a pick-up roller $1b_2$, may be fed onto contact glass $1a_2$ by the rotation of a document transport belt $1b_3$, and stops there.

A motor, not indicated in the diagram, that drives the a pick-up roller $1b_2$ and the document transport belt $1b_3$, etc., a clutch, and a electronic substrate that controls the motor and clutch, etc. may be provided to the back side of the aforementioned pick up roller $1b_2$ and the aforementioned document transport belt $1b_3$. The document image of the document O mounted on the aforementioned contact glass $1a_2$ may be read by a read unit $1a_3$ in the aforementioned document image reading device main body 1a. The read unit $1a_3$ may have a light source $1a_{31}$ that illuminates the document on the contact glass $1a_2$, an optical system $1a_{32}$ that focuses the document image of the document O, and an photoelectric conversion element including a CCD $1a_{33}$ that forms the document image of the document O. After the reading of the document image of the document O has been completed, the document O may be transported in the direction of the arrow B indicated in FIG. 2 based on the rotation of the document transport belt $1b_3$, and may be ejected into the aforementioned document ejection tray 1d.

In this manner, each page of the document O may be fed onto the contact glass $1a_2$, and the document image of that document O may be automatically read by the read unit $1a_3$.

A photosensitive drum of an image support unit 2a may be rotatably supported and arranged inside the image formation unit 2 in which the toner image is formed by, for example, an electrophotographic method. The image support unit 2a may be rotated and driven in a counterclockwise direction in the direction of the arrow C indicated in FIG. 2, and a surface of the image support unit 2a may be charged with a specified electric potential by a charge device 2b. A laser light L that is optically modulated corresponding to the image data read by the reading unit $1a_3$ may be emitted from a writing unit 2c, and the laser light L may expose the surface of the charged image support unit 2a, and a electrostatic latent image may be formed on the surface of the image support unit 2a.

The electrostatic latent image formed on the surface of the image support unit 2a may be developed and become a toner image when passing through a developing device 2d, and may be transferred and recorded on the recording paper of the recording medium P fed between the image support unit 2a and an opposing transfer device 2e by the aforementioned transfer device 2e. The surface of the image support unit 2a after the toner image is transferred onto the recording paper of the recording medium P may be cleaned by a cleaning device 2f, and may be prepared for the next image formation process.

A paper feed device 7 may be arranged below the image formation unit 2, and the recording paper of the recording medium P may be sent in the direction of the arrow (D) indicated in FIG. 2 from any of the paper feed cassette 7a, the paper feed cassette 7b, or the paper feed cassette 7c, and the toner image formed on the surface of the image support unit 2a may be transferred to the surface of the recording paper of the recording medium P as previously described.

The recording medium P may pass through a fixing device 2g within the image formation unit 2 in the direction of the arrow E indicated in FIG. 2, and the toner image transferred to the surface of the recording medium P may be fixed to that surface by heat and/or pressure. The recording medium P that has passed through the aforementioned fixing device 2g may be ejected in the direction of the arrow F indicated in FIG. 2 by a pair of rollers $2h_1$ of the ejection unit $2h$, and may be stacked and stored in the internal paper ejection unit 3.

Figure 3:
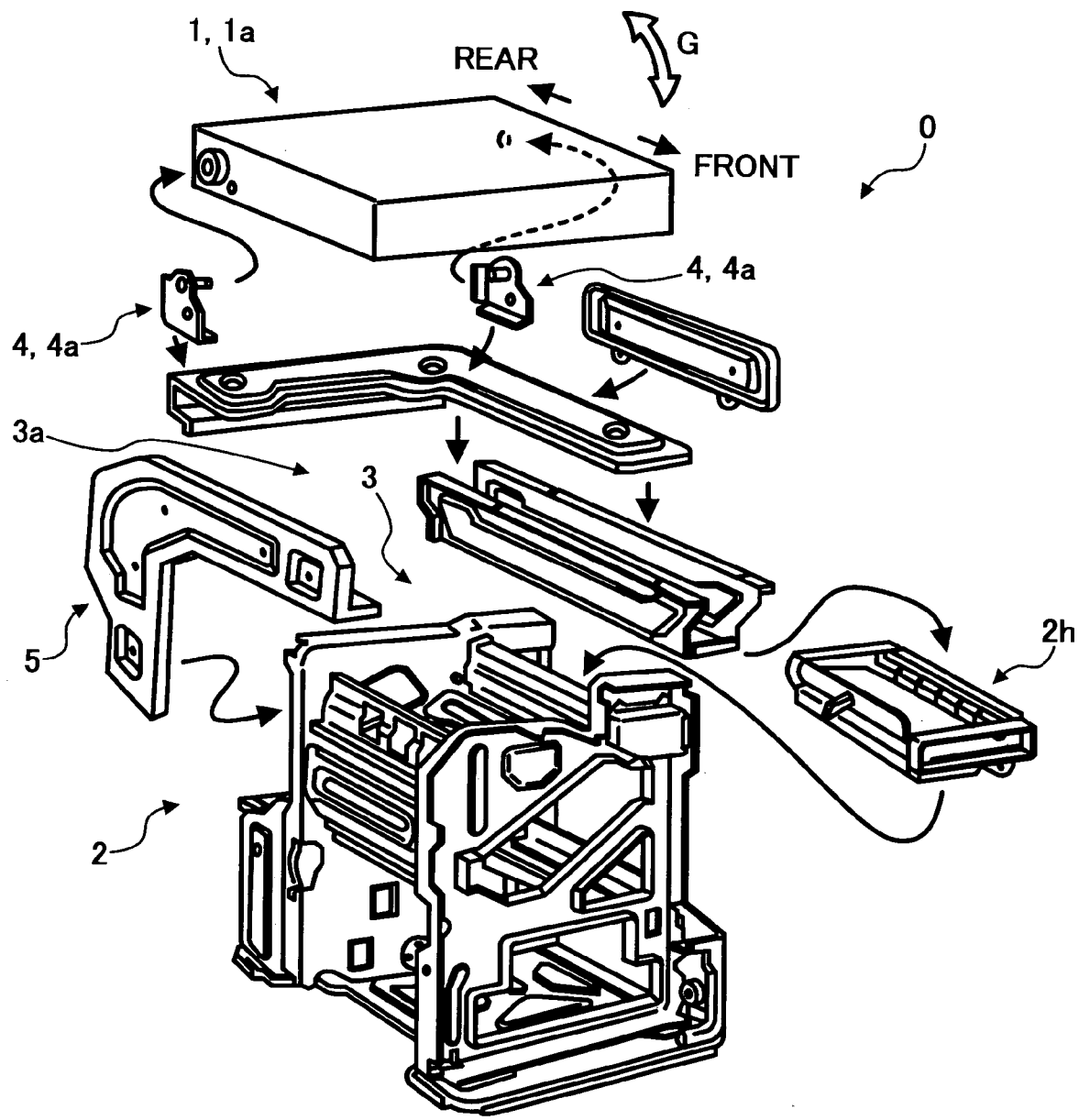
FIG. 3 is a development diagram indicating an analysis of parts of an image formation device related to an example embodiment of the present invention.
Figure 4:
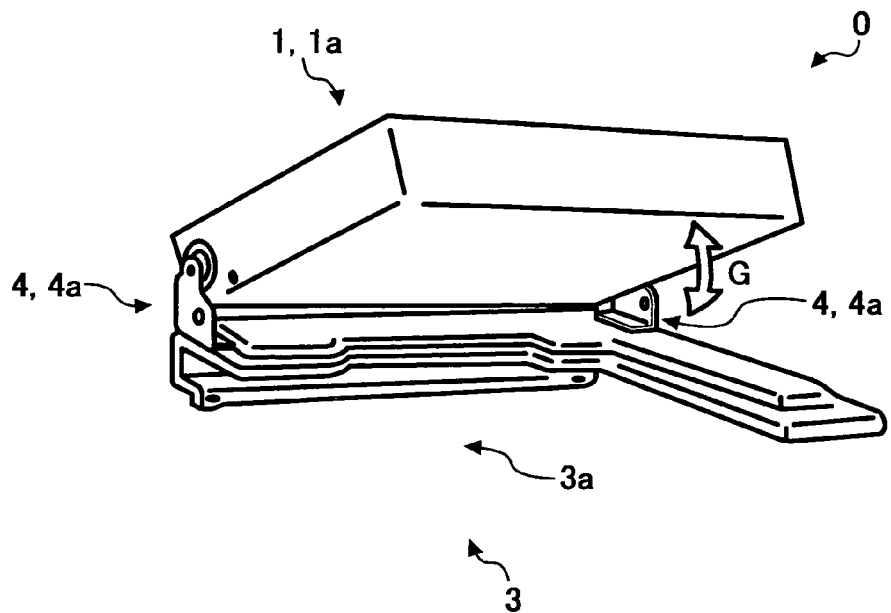
FIGS. 4 to 7 are angle view diagrams indicating the configuration of parts of an image formation device related to an example embodiment of the present invention.

FIG. 3 is a partial slant angle diagram indicating the configuration of a movable support of an example embodiment of the present invention and FIG. 4 is a diagram in the assembled state. In the diagrams, the internal paper ejection unit 3 of the image formation device 0 may be provided a larger ejection space for the recording medium P between the image formation unit 2 and the document image reading device main body $1a$ of the document image reading device 1, the operability of the operation to remove the stacked recorded medium P may be improved, and/or the opening part $3a$ is formed with the left front opened as indicated in the diagram.

Opening part $4a$ of the movable support 4 may be supported at a plurality of support points at the rear of the document image reading device main unit $1a$ so that the side surface of the document image reading device main unit $1a$ can move to open vertically in the direction of the arrow G indicated in FIG. 3. By opening the document image reading device main unit $1a$ of the image formation device 0 to a position in the opening direction in the direction of the arrow G indicated in FIG. 3, the ejection unit $2h$ that ejects the recording medium P into the internal paper ejection unit 3 and the read unit $2c$, not indicated in the diagram, within the image formation unit 2 are not blocked by the document image reading device main body $1a$. In addition to improved maintenance characteristics, the aforementioned read unit $2c$, etc., not indicated in the diagram, within the image formation unit 2 may be more easily accessed by removing the outer member cover 5 below the internal paper ejection unit 3.

Figure 5:
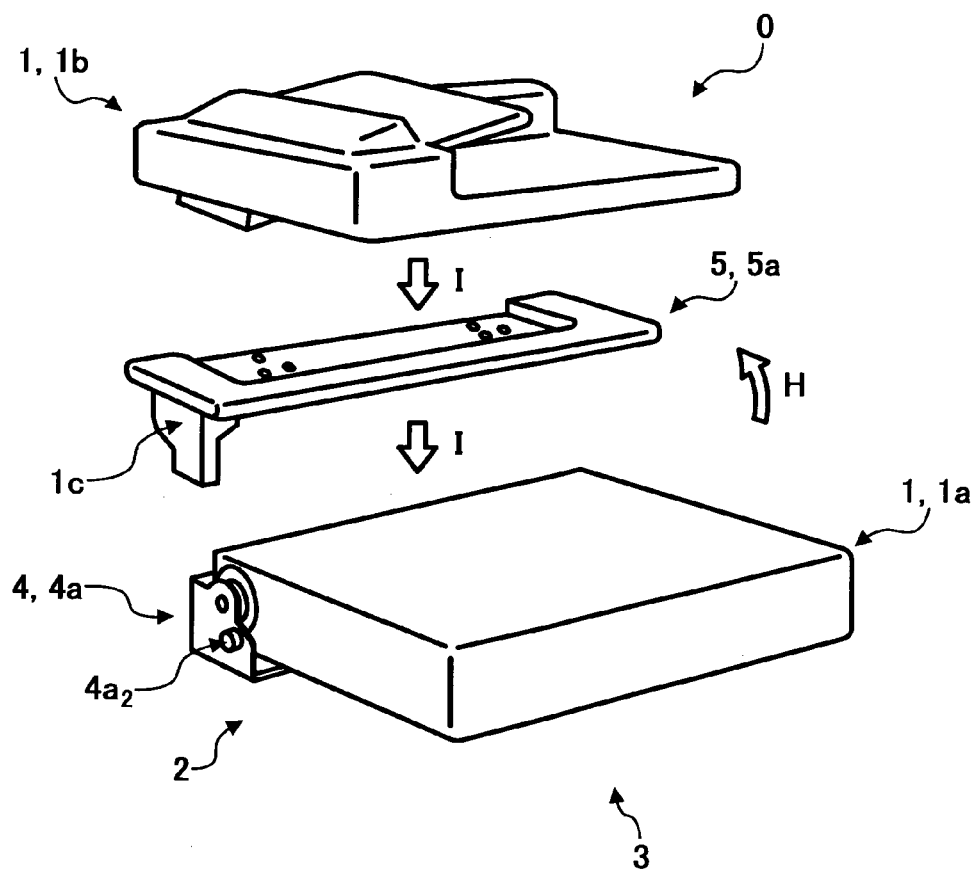

In FIG. 5, by fastening the securing screws of the document image reading device securing member $4a_2$ of the opening part $4a$ to prevent opening of the document image reading device main body $1a$ in the direction of the arrow H indicated in the diagram, the opening and closing can be more reliably secured, and/or safety can be more reliably guaranteed. The document image reading device main body $1a$ may be prevented from opening in the direction of the arrow H indicated in FIG. 5 by the automatic document feeder (ADF) $1b$ based on the opening prevention member $1c$ of the automatic document feeder (ADF) attaching and detaching member $5a$.

By mounting the automatic document feeder (ADF) $1b$ on the document image reading device main body $1a$ in the direction of the arrow I indicated in FIG. 5, the opening prevention member $1c$ of the automatic document feeder (ADF) attaching and detaching member $5a$ may extend out of the shape of the cover outside of the securing screws of the document image reading device securing member $4a_2$, and may hide the securing screws. Unless the automatic document feeder (ADF) $1b$ is removed from the document image reading device main body $1a$, the document image reading device main body $1a$ may not be opened in the direction of the arrow H indicated in FIG. 5.

For the operator to open the document image reading device main body $1a$ in the direction of the arrow H indicated in FIG. 5, in order to remove the securing screws fastening the document image reading device securing member $4a_2$ with the image formation unit 2, the securing screws of the document image reading device securing member $4a_2$ need not be exposed unless conducting the operations of: (1) removing the automatic document feeder (ADF) $1b$, and/or (2) removing the automatic document feeder (ADF) attaching and detaching member $5a$ below to which the opening prevention member $1c$ belongs.

Consequently, even in a configuration of the image formation device 0 in which the automatic document feeder (ADF) $1b$ is added and set up above the document image reading device main body $1a$ (refer to FIG. 1), safety can be reliably guaranteed, and the risk of the load during opening of the document image reading device main body $1a$ increasing because the greater weight of that added part and of the operator being unable to finish the opening operation midway through and causing an accident by letting go with the hands and letting the unit drop can be reliably reduced. Specifically, because the document image reading device $1a$ may not be opened unless the automatic document feeder $1b$ is removed, one or more of the above risks may be reduced.

Figure 6:
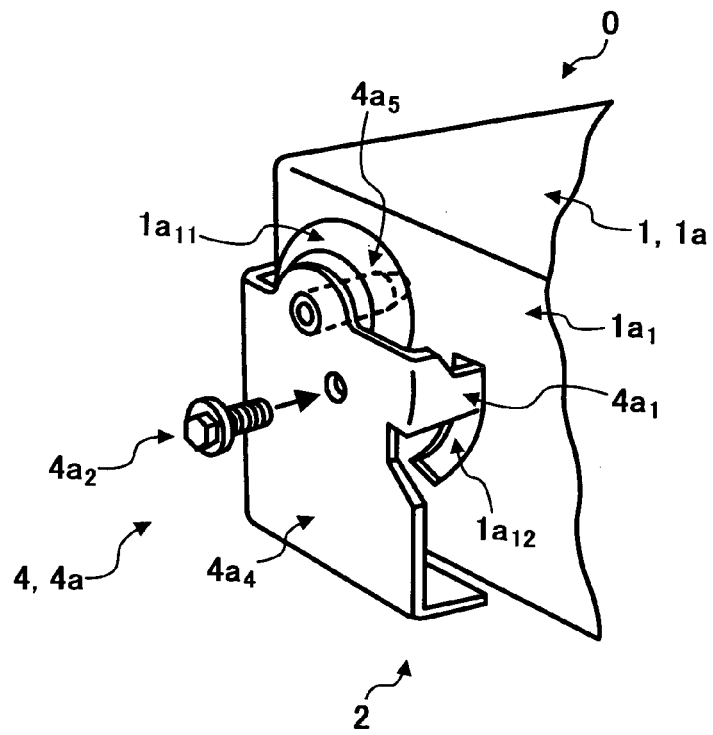

In FIG. 6, the image formation device 0 may have a configuration such that the angle of opening the document image reading device main body $1a$ is regulated by an opening angle regulating member $4a_1$ of an opening part $4a$. Regarding the opening part $4a$, a support point axle $4a_5$ secured to a support point member $4a_4$ from the image formation unit 2 side may pass through an opening support point member (support hole) $1a_{11}$ secured to the frame $1a_1$ of the document image reading device main body $1a$ side.

The opening angle regulation member $4a_1$ from the support member $4a_4$ and the opening support point member $1a_{11}$ secured to the frame $1a_1$ of the document image reading device main body $1a$ side may be configured to overlap in the opening part $1a_{12}$ that has been formed. When mated in the elliptical opening part $1a_{12}$, the opening angle regulation member $4a_1$ may rotate in the vertical direction centered on the support point axle $4a_5$, and the limits to the range of the rotational angle may be determined by the opening part $1a_{12}$.

When the document image reading device main body $1a$ is opened, the opening angle regulation member $4a_1$ may interfere with the opening part $1a_{12}$ at a given angle, and the angle may be regulated. Consequently, a problem of tipping over backward based on the document image reading device main body $1a$ being opened a large amount and the center of gravity of the document image reading device main body $1a$ itself moving backward may be more naturally controlled, and safety can be more reliably provided.

Figure 7:
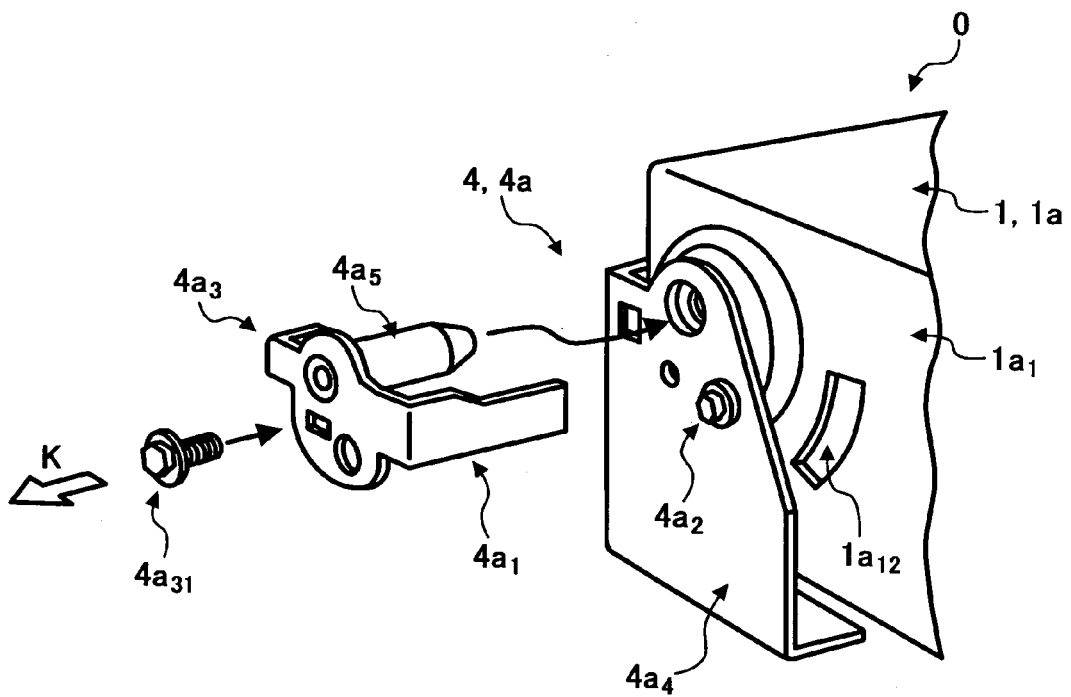

In FIG. 7, the document image reading device attachment and detachment member $4a_3$ of the opening part $4a$ may be easily replaced by attaching and detaching the document image reading device main body $1a$. The document image reading device attachment and detachment member $4a_3$ may be a member that makes the support point axle $4a_5$ and the opening angle regulation member $4a_1$ separate from the support point member $4a_4$. When removing in order to replace the document image reading device main body $1a$, the document image reading device main body $1a$ and the image formation unit 2 to which the support point member $4a_4$ is secured may be easily separated by removing connecting wires not indicated in the diagram, the securing screws of the document image reading device securing member $4a_2$, and/or the document image reading device attachment and detachment securing screws $4a_{31}$, and by pulling out the document image reading device attachment and detachment member $4a_3$ in the direction of the arrow K indicated in FIG. 7.

Consequently, the image formation device 0 may improve the separation and replacement characteristics of the document image reading device main body $1a$ based on the document image reading device attachment and detachment member $4a_3$.

Figure 8:
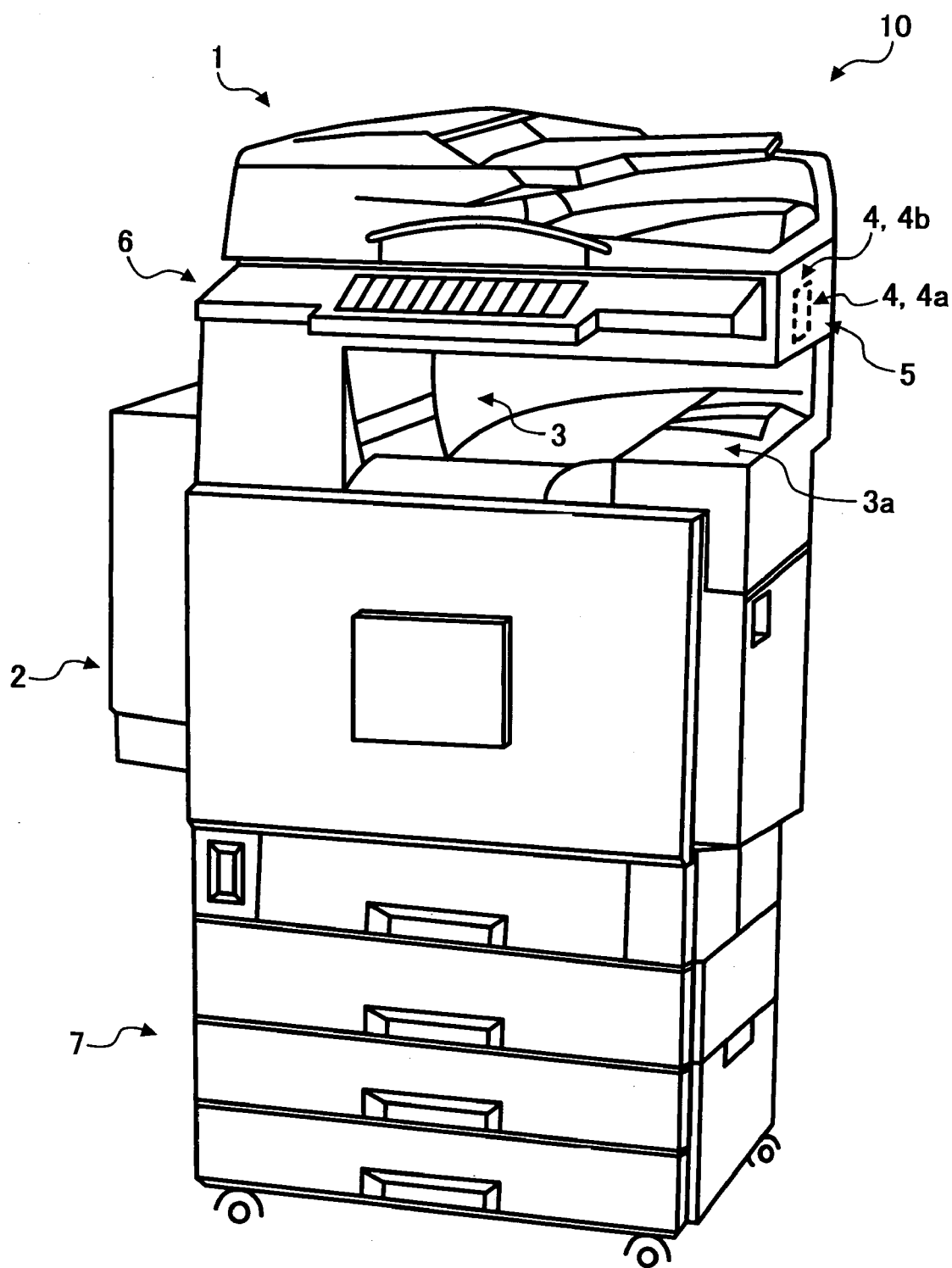
FIG. 8 is an angle view diagram indicating the exterior appearance of an image formation device related to another example embodiment of the present invention.
Figure 9:
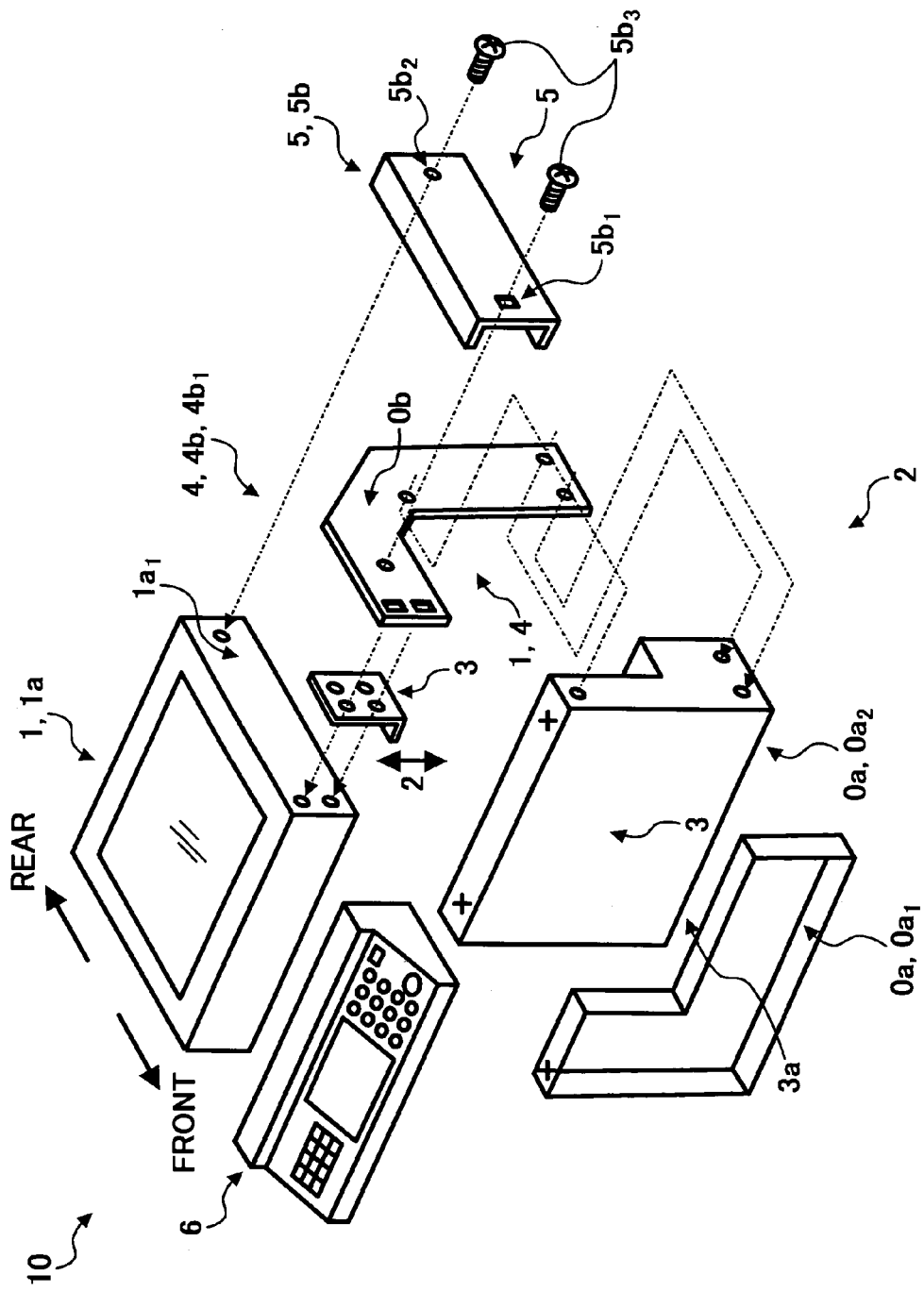
FIG. 9 is a development diagram indicating an analysis of parts of an image formation device related to an example embodiment of the present invention.

In FIG. 8 and FIG. 9, the example image formation device 10 indicated may include a document image reading device 1 that reads document images, an image formation unit 2 that is arranged below the aforementioned document image reading device 1, and forms images on recording media P, an internal paper ejection unit 3 by which recording medium P, on which images have been formed by the image formation unit 2, is ejected between the document image reading device 1 and the image formation unit 2, an opening part $3a$ that opens on the right front side of the internal paper ejection unit 3, and a movable support 4 that supports the document image reading device 1 on the side surface of the document image reading device 1 in a manner movable to a specified position by a plurality of support parts that support the document image reading device 1 on the upper part of the internal paper ejection device 3 having the opening part $3a$ (support position adjustment part $4b$ that adjusts at least one support position where the document image reading device main body $1a$ is supported by the plurality of support parts). A simple configuration may be used to reduce blockage of the position below the document image reading device 1 by the document image reading device 1 and generation of abnormal images by skewing, etc. based on the document image reading device 1 having a configuration insufficiently strong at the opening part $3a$ of the internal paper ejection unit 3 compared to the other support parts. The space-saving image formation device may have an interior paper ejection unit 3 with a large interior, have satisfactory recording medium P removal operability, may improve supply replacement characteristics, for example, toner cartridges not indicated in the diagram, and may have improved maintenance characteristics, for example, unit replacement and adjustment.

A support position adjustment member $4b_1$ may be supported on a structural unit $0b$ positioned on the side surface of the device main unit $0a$, and may use a simpler configuration to adjust at least one position where the document image reading device main body $1a$ is supported by the plurality of support parts. The document image reading device main body $1a$ may be supported at the three locations marked by X in FIG. 9 on a device main unit frame $0a_1$ and a device main unit frame $0a_2$, and may be secured by a securing member not indicated in the diagram. An opening part $3a$ on the right front of the internal paper ejection unit 3 may be supported and secured through a support position adjustment member $4b_1$ that can move vertically from the right side surface based on the L-shaped structural unit $0b$ secured to the device main unit frame $0a_2$.

The front side of a right cover $5b$ of the structural unit $0b$ and of an exterior cover may be screwed onto the structural unit $0b$ from the outside, and the rear side of the right cover $5b$ may be screwed onto the frame $1a_1$. In order to vary the position of the front side of the right cover $5b$ based on the support position adjustment member $4b_1$, the screw hole $5b_1$ may differ from the screw hole $5b_2$ and may be a long hole in the vertical direction so that the right cover $5b$ can follow the support position adjustment member $4b_1$ and the document image reading device main body $1a$. The outside of the structural unit $0b$ that secures and supports the support position adjustment member $4b_1$ which may be covered by the right cover $5b$, may be safer and/or have improved exterior product quality.

Further, the order when assembling the document image reading device main body $1a$ and the support position adjustment member $4b_1$ may be: (1) provisionally tightening the support position adjustment member $4b_1$ with the structural unit $0b$; (2) placing the document image reading device main body $1a$ in the support position adjustment member $4b_1$; (3) securing the support position adjustment member $4b_1$ and the frame $1a_1$ of the document image reading device main body $1a$; (4) suitably adjusting the position of the support position adjustment member $4b_1$, and securing and supporting to the structural unit $0b$; and (5) tightening the right cover $5b$ with the screw $5b_3$.

Figure 10:
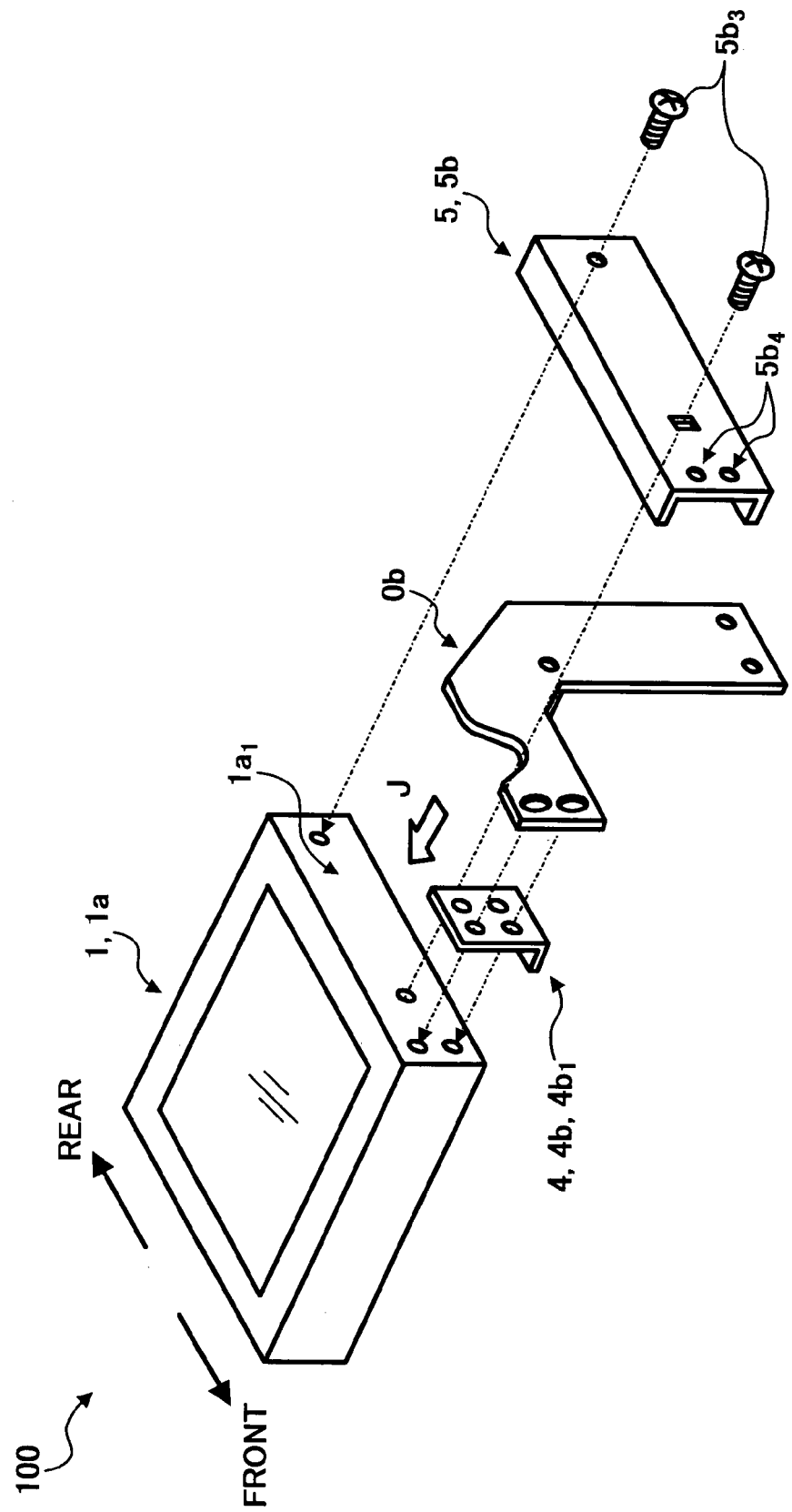
FIGS. 10 to 14 diagrams for explaining the configuration of parts of an image formation device related to an example embodiment of the present invention.

FIG. 10 is a diagram to explain the configuration of parts of another configuration of the present invention. In FIG. 10, a difference between the image formation device 100 and the image formation device 10 is in the position determination and securing of the right cover $5b$ of the exterior cover 5 and/or the front side of the right cover $5b$ may be directly screwed to the frame $1a_1$ of the document image reading device main body $1a$ as indicated by the arrow J in FIG. 10.

In this way, the support position adjustment member $4b_1$ and the structural unit $0b$ that secures and supports the support position adjustment member $4b_1$ may be covered by the right cover $5b$, and may be safer and/or have improved exterior product quality. A long hole may be provided in the end of the L-shaped plate of the structural unit $0b$, and can be attached by screwing down while finely adjusting the vertical position of the support position adjustment member $4b_1$.

Further, the order when assembling the document image reading device main body $1a$ and the support position adjustment member $4b_1$ of the image formation device 100 may be: (1) provisionally tightening the support position adjustment member $4b_1$ by the structural unit $0b$; (2) placing the document image reading device main body $1a$ in the support position adjustment member $4b_1$; (3) securing the support position adjustment member $4b_1$ and the frame $1a_1$ of the document image reading device main body $1a$; (4) tightening the right cover $5b$ with the screw $5b_3$; (5) loosening the screw, not indicated in the diagram, of the support position adjustment member $4b_1$ provisionally tightened from the opening part (whole) $5b_4$ of the right cover $5b$; and (6) suitably adjusting the position of the support position adjustment member $4b_1$, and securing to the aforementioned structural unit $0b$.

Although in FIG. 10, only the system of determining the position and tightening to the frame $1a_1$ of the document image reading device main body $1a$ was indicated, but it is also possible to determine the position and secure the right cover $5b$ using a perpendicular surface of the support position adjustment member $4b_1$. If the support position adjustment member $4b_1$ is mounted in the front and back direction, and the length of the support position adjustment member $4b_1$ is equivalent to the depth of the document image reading device main body $1a$, the position determination and securing of the right cover $5b$ may be conducted in relation to the support position adjustment member $4b_1$.

Consequently, a safe and space-saving image formation device 100 may be provided that uses a simple configuration to reduce operational damage by the document image reading device main body $1a$ and generation of abnormal images by skewing, etc., that has a large space inside of the interior paper ejection unit 3, has satisfactory recording medium P removal operability, makes adjustment of the support position adjustment member $4b_1$ possible while the right cover $5b$ is mounted, has improved maintenance characteristics, for example, unit replacement and adjustment, and/or has improved exterior product quality.

Figure 11:
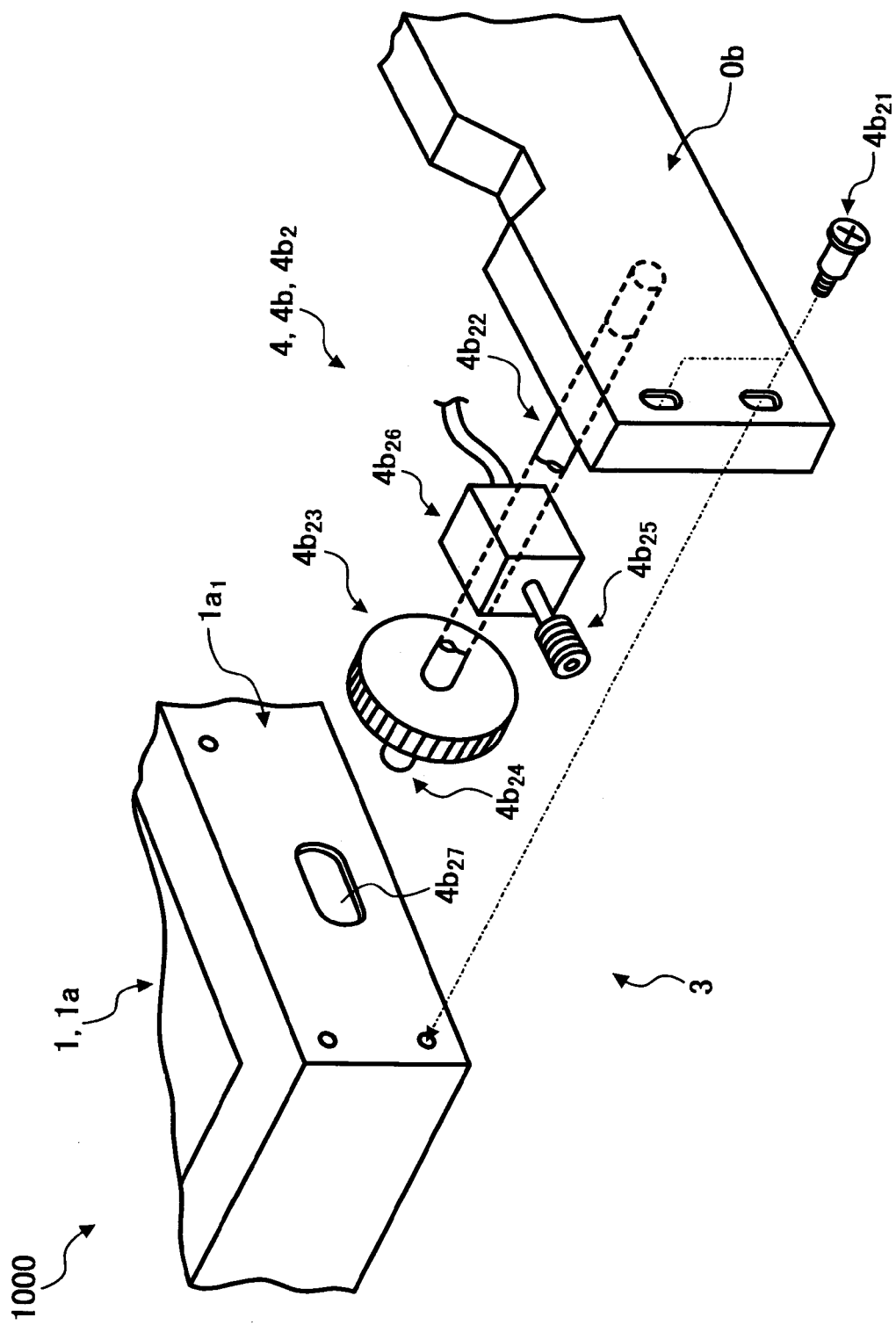
Figure 12:
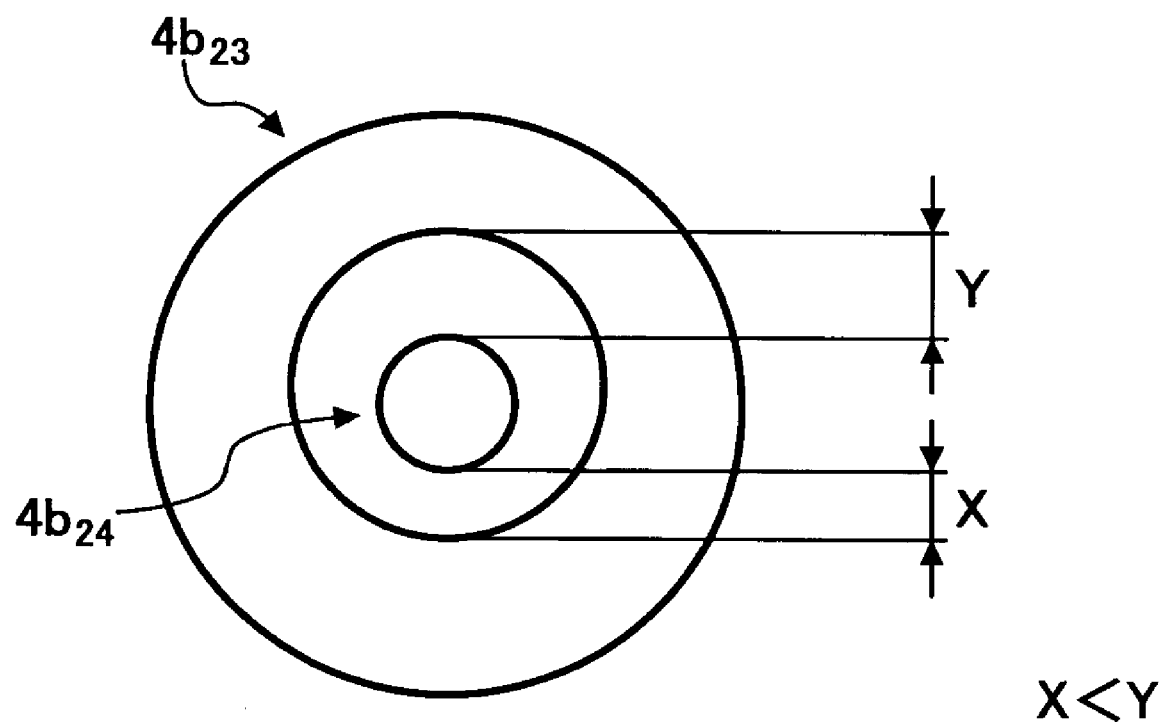

FIG. 11 and FIG. 12 are configurational diagrams of parts of another embodiment of the present invention. In these figures, the image formation device 1000 can automatically conduct fine adjustments of at least one place where the document image reading device main body $1a$ may be supported based on the drive unit $4b_2$ of the support position adjustment part $4b$ of the movable support 4. The stage screw $4b_{21}$ may tighten the drive unit $4b_2$ to the structural unit $0b$ and the frame $1a_1$ moveably in the vertical direction. A long hole that mates with the stage screw $4b_{21}$ may be formed in the structural unit $0b$.

An axle $4b_{22}$ may be placed in the interior side surface of the structural unit $0b$, and the eccentric boss $4b_{24}$ that, as indicated in FIG. 11, is eccentric (X<Y) in relation to the axle $4b_{22}$ is placed in the frame $1a_1$ side of the worm wheel $4b_{23}$ that rotates centered on the axle $4b_{22}$. The rotation drive of the worm wheel $4b_{23}$ may be based on the drive source $4b_{26}$, for example, a stepping motor attached on the rotational axis of the cylindrical worm $4b_{25}$. The eccentric boss $4b_{24}$ may be placed in the long hole $4b_{27}$ of the aforementioned frame $1a_1$ side of the document image reading device main body $1a$, and it is possible to adjust the position of the aforementioned frame $1a_1$ of the document image reading device main body $1a$ vertically by transmitting the drive of the aforementioned drive source $4b_{26}$ and rotating the aforementioned eccentric boss $4b_{24}$.

Consequently, a safe and space-saving image formation device 1000 may be provided that uses a simpler configuration to reduce blockage by the document image reading device main body $1a$ and generation of abnormal images by skewing, etc., that has a large space inside of the interior paper ejection unit 3, has satisfactory recording medium P removal operability, can automatically finely adjust the position of the document image reading device main body $1a$, has improved maintenance characteristics, for example, unit replacement and adjustment, and/or has improved exterior product quality.

Figure 13:
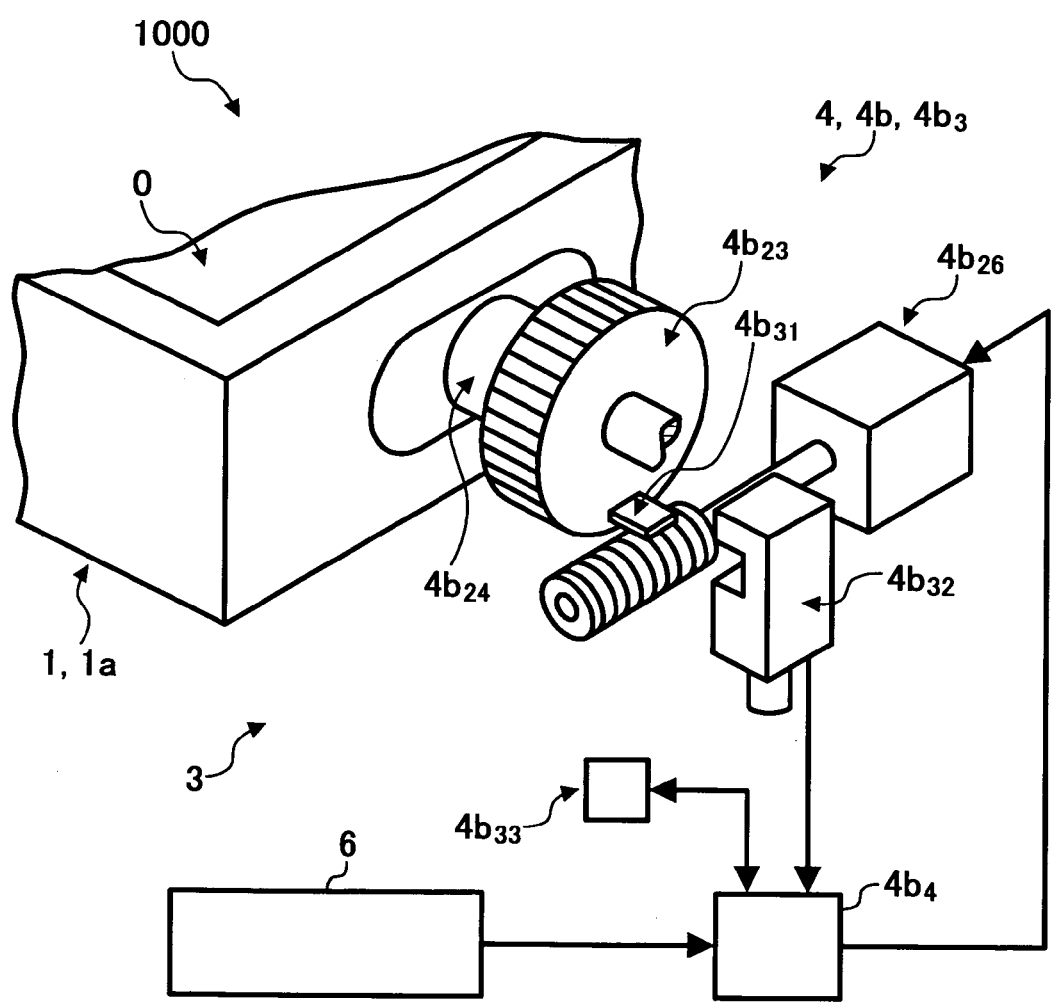
Figure 14:
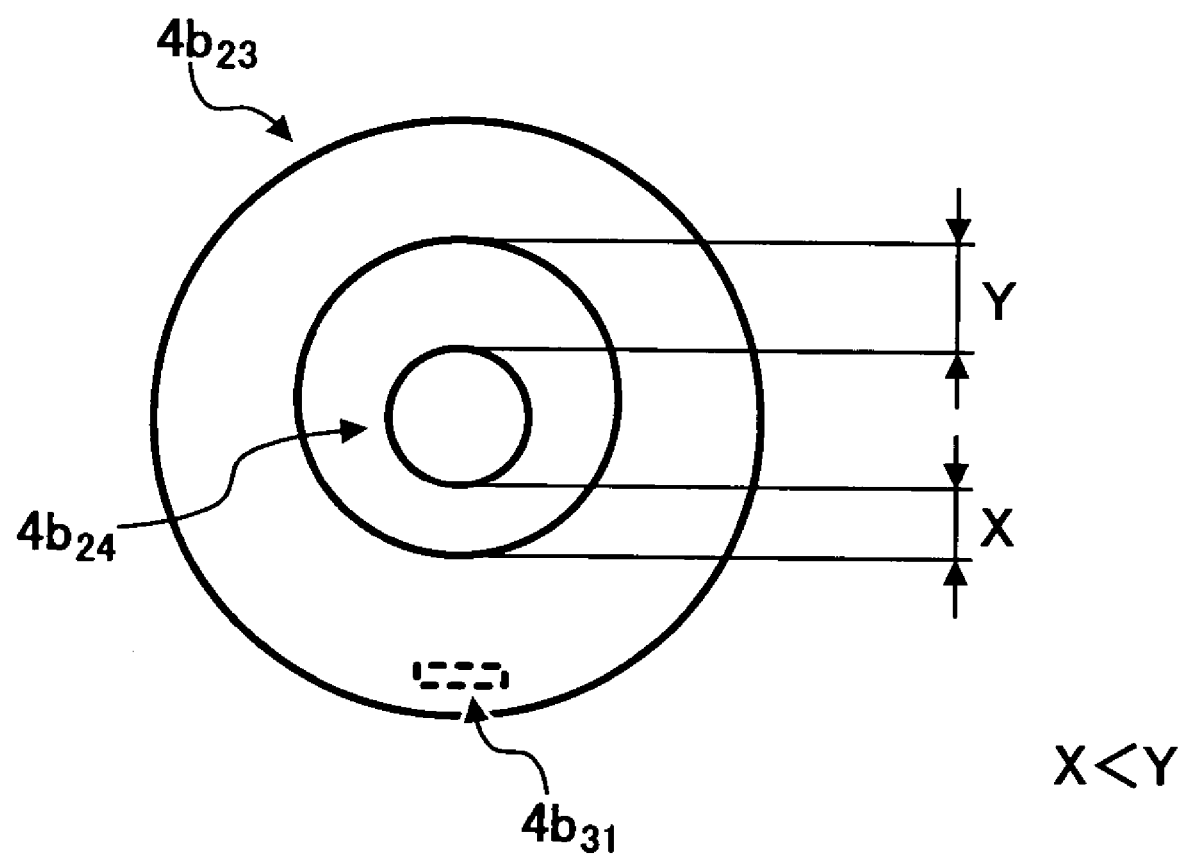

FIG. 13 and FIG. 14 are configurational diagrams of parts of another embodiment of the present invention. In these figures, the image formation device 1000 can detect the position of at least one place where the document image reading device main body $1a$ is supported based on a detection unit $4b_3$ of the support position adjustment part 4b of the movable support 4, and therefore the position of the document image reading device main body $1a$ can be more finely adjusted with higher precision.

A rib $4b_{31}$ may be placed in a position where there is the least amount of eccentricity (X<Y) of the side surface of the worm wheel $4b_{23}$, and the sensor $4b_{32}$ may be attached there and taken as the standard position. The relation of the number of rotations of the drive source $4b_{26}$ and the amount of eccentricity of the eccentric boss $4b_{24}$ may be stored in advance in the memory device $4b_{33}$, and if adjustment of the position of the document image reading device main body $1a$ is required, the document image reading device main body $1a$ can be adjusted to a specified position by the rotational drive of the drive source $4b_{26}$ by a specified number of rotations. To readjust, accurate position adjustment is possible by returning the document image reading device main body $1a$ up to the standard position again.

Consequently, a safe and space-saving image formation device 1000 may be provided that uses a simple configuration to reduce blockage by the document image reading device main body $1a$ and generation of abnormal images by skewing, etc., that has a large space inside of the interior paper ejection unit 3, has satisfactory recording medium P removal operability, can finely adjust the position of the document image reading device main body $1a$ with higher precision, has improved maintenance characteristics, for example, unit replacement and adjustment, and/or has improved exterior product quality.

A method of detecting and controlling distortion of the document image reading device main body $1a$ will be explained. With an image formation device, for example, image formation device 1000, finer adjustment at higher precision can be automatically conducted using the control unit $4b_4$ to make at least one support position where the document image reading device main unit $1a$ is supported at a suitable position.

A document O with an accurate lengthwise form may be used, and the dimensions of the various parts of the lengthwise form may be stored in the recording device $4b_{33}$, and the document O may be read by the document image reading device main body $1a$. The amount of distortion of the document image reading device main body $1a$ may be measured using the control unit $4b_4$ to compare the data read by the document image reading device main body $1a$ with the dimensions stored in the memory device $4b_{33}$, and the document image reading device main body $1a$ may be automatically adjusted to a suitable position.

A factor that may cause generation of distortion, for example, the skewing of the recording medium P are may also be in the plotter part of the image formation unit 2 not indicated in the diagram, but as a method to detect distortion including this factor, the aforementioned document O of the lengthwise shape may be read by the document image reading device main body $1a$, the toner image may be formed by outputting the read image to the recording medium P, the toner image may again be read by the document image reading device main body $1a$, and the aforementioned image formation device 1000 can read the total amount of distortion if the read data are compared with the dimensions recorded in the aforementioned recording device $4b_{33}$.

This amount of distortion, the trends, and/or the adjustment position of document image reading device main body $1a$ corresponding to these may be stored in the aforementioned memory device $4b_{33}$ in advance, thereby it is possible to correct abnormal images by skewing, etc. by adjusting the position of the document image reading device main body $1a$ according to the distortion of the image.

Consequently, a safe and space-saving image formation device 1000 may be provided that uses a simple configuration to reduce blockage by the document image reading device main body $1a$ and generation of abnormal images by skewing, etc., that has a large space inside of the interior paper ejection unit 3, has satisfactory recording medium P removal operability, allows the user to easily conduct a series of operations to adjust the position of the document image reading device main body $1a$ from the aforementioned operating panel 6 because removal of the exterior cover 5 is not necessary, reduces labor required to remove the exterior cover 5 when conducting the adjustment operation in the factory, has improved maintenance characteristics, for example, unit replacement and adjustment, and/or has improved exterior product quality.

One or more example embodiments of the present invention may have one or more of the following advantages.

A space-saving image formation device may be provided that uses a simpler configuration to reduce blockage by the document image reading device and generation of abnormal images by skewing, etc., that has an interior of the internal paper ejection unit with a larger space, has satisfactory operability for removing the recording medium, and/or has improved maintenance characteristics, for example, unit replacement and adjustment.

A space-saving image formation device that automatically transports the documents may be provided that uses a simpler configuration to reduce blockage by the document image reading device and generation of abnormal images by skewing, etc., that has an interior of the internal paper ejection unit with a larger space, has satisfactory operability for removing the recording medium, and/or has improved maintenance characteristics, for example, unit replacement and adjustment.

A space-saving image formation device that automatically transports the documents may be provided that uses a simpler configuration to reduce blockage by the document image reading device and generation of abnormal images by skewing, etc., that has an interior of the internal paper ejection unit with a larger space, has satisfactory operability for removing the recording medium, has improved maintenance characteristics, for example, unit replacement and adjustment, and/or can improve safety by reducing the risk of producing an accident by dropping, etc.

A space-saving image formation device that forms high quality images at high speed may be provided that uses a simpler configuration to reduce blockage by the document image reading device and generation of abnormal images by skewing, etc., that has an interior of the internal paper ejection unit with a larger space, has satisfactory operability for removing the recording medium, and/or has improved maintenance characteristics, for example, unit replacement and adjustment.

A space-saving image formation device may be provided that uses a simpler configuration to reduce blockage by the document image reading device and generation of abnormal images by skewing, etc., that has an interior of the internal paper ejection unit with a larger space, has satisfactory operability for removing the recording medium, has easier access to the writing unit within the image formation unit without blockage by the document image reading device main body of the document image reading device, and/or has improved maintenance characteristics, for example, unit replacement and adjustment.

A space-saving image formation device may be provided that uses a simpler configuration to reduce blockage by the document image reading device and generation of abnormal images by skewing, etc., that has an interior of the internal paper ejection unit with a larger space, has satisfactory operability for removing the recording medium, has easier access to the writing unit within the image formation unit without blockage by the document image reading device main body of the document image reading device, has improved maintenance characteristics, for example, unit replacement and adjustment, and/or can improve safety by controlling damage by tipping over backward.

A space-saving image formation device may be provided that uses a simpler configuration to reduce blockage by the document image reading device and generation of abnormal images by skewing, etc., that has an interior of the internal paper ejection unit with a larger space, has satisfactory operability for removing the recording medium, has easier access to the writing unit within the image formation unit without blockage by the document image reading device main body of the document image reading device, has improved maintenance characteristics, for example, unit replacement and adjustment, and/or can improve safety by reliably securing opening and closing to prevent opening of the document image reading device main body of the document image reading device.

A space-saving image formation device may be provided that uses a simpler configuration to reduce blockage by the document image reading device and generation of abnormal images by skewing, etc., that has an interior of the internal paper ejection unit with a larger space, has satisfactory operability for removing the recording medium, has easier access to the writing unit within the image formation unit without blockage by the document image reading device main body of the document image reading device, can improve separation and replacement of the document image reading device main body of the document image reading device, and/or has improved maintenance characteristics, for example, unit replacement and adjustment.

A space-saving image formation device may be provided that uses a simpler configuration to reduce blockage by the document image reading device and generation of abnormal images by skewing, etc., that has an interior of the internal paper ejection unit with a larger space, has satisfactory operability for removing the recording medium, and/or has improved maintenance characteristics, for example, unit replacement and adjustment to reduce generation of abnormal images, for example, skewing, etc. based on a document image reading device having an opening part of the internal paper ejection unit with a configuration of insufficient strength at least compared to other support parts.

A space-saving image formation device may be provided that uses a simpler configuration to reduce blockage by the document image reading device and generation of abnormal images by skewing, etc., that has an interior of the internal paper ejection unit with a larger space, has satisfactory operability for removing the recording medium, and/or has improved maintenance characteristics, for example, unit replacement and adjustment that uses a simpler configuration of a support position adjustment member to reduce generation of abnormal images, for example, skewing, etc. based on a document image reading device having an opening part of the internal paper ejection unit with a configuration of insufficient strength at least compared to other support parts.

A safe and space-saving image formation device may be provided that uses a simpler configuration to reduce blockage by the document image reading device and generation of abnormal images by skewing, etc., that has an interior of the internal paper ejection unit with a larger space, has satisfactory operability for removing the recording medium, has improved maintenance characteristics, for example, unit replacement and adjustment to reduce generation of abnormal images, for example, skewing, etc. based on a document image reading device having an opening part of the internal paper ejection unit with a configuration of insufficient strength at least compared to other support parts, and/or has improved exterior product quality.

A safe and space-saving image formation device may be provided that uses a simpler configuration to reduce blockage by the document image reading device and generation of abnormal images by skewing, etc., that has an interior of the internal paper ejection unit with a larger space, has satisfactory operability for removing the recording medium, has improved maintenance characteristics, for example, unit replacement and adjustment to reduce generation of abnormal images, for example, skewing, etc. based on a document image reading device having an opening part of the internal paper ejection unit with a configuration of insufficient strength at least compared to other support parts by determining the position of the frame of the document image reading device main body of a document image reading device without removing the secured outer cover, and/or has improved exterior product quality.

A safe and space-saving image formation device may be provided that uses a simpler configuration to reduce blockage by the document image reading device and generation of abnormal images by skewing, etc., that has an interior of the internal paper ejection unit with a larger space, has satisfactory operability for removing the recording medium, has improved maintenance characteristics, for example, unit replacement and adjustment to reduce generation of abnormal images, for example, skewing, etc. based on a document image reading device having an opening part of the internal paper ejection unit with a configuration of insufficient strength at least compared to other support parts by determining the position using a support position adjustment member of a support position adjustment part of a movable support without removing the secured outer cover, and/or has improved exterior product quality.

A safe and space-saving image formation device may be provided that uses a simpler configuration to reduce blockage by the document image reading device and generation of abnormal images by skewing, etc., that has an interior of the internal paper ejection unit with a larger space, has satisfactory operability for removing the recording medium, has improved maintenance characteristics, for example, unit replacement and adjustment to reduce generation of abnormal images, for example, skewing, etc. based on a document image reading device having an opening part of the internal paper ejection unit with a configuration of insufficient strength at least compared to other support parts by determining the position of the frame of the document image reading device main body of a document image reading device and by determining the position using a support position adjustment member of a support position adjustment part of a movable support without removing the secured outer cover, and/or has improved exterior product quality.

A space-saving image formation device may be provided that uses a simpler configuration to reduce blockage by the document image reading device and generation of abnormal images by skewing, etc., that has an interior of the internal paper ejection unit with a larger space, has satisfactory operability for removing the recording medium, and/or has improved maintenance characteristics, for example, unit replacement and adjustment that can automatically conduct fine adjustments of the support position adjustment part of a movable support to reduce generation of abnormal images, for example, skewing, etc. based on a document image reading device having an opening part of the internal paper ejection unit with a configuration of insufficient strength at least compared to other support parts.

A space-saving image formation device may be provided that uses a simpler configuration to reduce blockage by the document image reading device and generation of abnormal images by skewing, etc., that has an interior of the internal paper ejection unit with a larger space, has satisfactory operability for removing the recording medium, and/or has improved maintenance characteristics, for example, unit replacement and adjustment that can conduct high-speed fine adjustments of the support position adjustment part of a movable support to reduce generation of abnormal images, for example, skewing, etc. based on a document image reading device having an opening part of the internal paper ejection unit with a configuration of insufficient strength at least compared to other support parts.

A space-saving image formation device may be provided that uses a simpler configuration to reduce blockage by the document image reading device and generation of abnormal images by skewing, etc., that has an interior of the internal paper ejection unit with a larger space, has satisfactory operability for removing the recording medium, and/or has improved maintenance characteristics, for example, unit replacement and adjustment that can automatically conduct fine adjustments of the support position adjustment part of a movable support to the optimum adjustment position to reduce generation of abnormal images, for example, skewing, etc. based on a document image reading device having an opening part of the internal paper ejection unit with a configuration of insufficient strength at least compared to other support parts.

A space-saving image formation device may be provided that uses a simpler configuration to reduce blockage by the document image reading device and generation of abnormal images by skewing, etc., that has an interior of the internal paper ejection unit with a larger space, has satisfactory operability for removing the recording medium, and/or has improved maintenance characteristics, for example, unit replacement and adjustment that uses a simpler configuration to save users and factory labor time when conducting fine adjustments of the support position adjustment part of a movable support to reduce generation of abnormal images, for example, skewing, etc. based on a document image reading device having an opening part of the internal paper ejection unit with a configuration of insufficient strength at least compared to three other support parts.

Various modifications will become possible for those skilled in the art after receiving the teachings of the present disclosure without departing from the scope thereof.

The present invention being thus described, it will be obvious that the same may be varied in many ways. Such variations are not to be regarded as a departure from the spirit and scope of the present invention, and all such modifications are intended to be included within the scope of the present invention.

What is claimed is:

1. An image formation device comprising:
   a document image reading device that reads document images;
   an image formation unit arranged below the document image reading device, and forms images on recording media;
   an internal paper ejection unit arranged between said document image reading device and said image formation unit and receives recording media on which images have been formed and which have been ejected;
   an opening part open on the right front or left front side of said internal paper ejection unit; and
   a movable support that supports said document image reading device on the a side surface of said document image reading device in a manner movable to a specified position by a plurality of support parts that support said document image reading device on the upper part of said internal paper ejection device having said opening part, wherein the movable support includes a support position adjustment part that adjusts at least one support position where the document image reading device is supported by the plurality of support parts, and the support position adjustment part includes a drive unit that adjusts at least one support position where the document image reading device is supported.

2. An image formation device comprising:
   a document image reading device that reads document images;
   an image formation unit arranged below the document image reading device, and forms images on recording media;
   an internal paper ejection unit arranged between said document image reading device and said image formation unit and receives recording media on which images have been formed and which have been elected;
   an opening part open on the right front or left front side of said internal paper ejection unit; and
   a movable support that supports said document image reading device on a side surface of said document image reading device in a manner movable to a specified position by a plurality of support parts that support said document image reading device on the upper part of said internal paper ejection device having said opening part, wherein the movable support includes a support position adjustment part having an elongated hole that adjusts at least one support position where the document image reading device is supported by the plurality of support parts, wherein the support position adjustment part includes a detection unit that detects at least one support position where the document image reading device is supported.

3. An image formation device comprising:

a document image reading device that reads document images;

an image formation unit arranged below the document image reading device, and forms images on recording media;

an internal paper ejection unit arranged between said document image reading device and said image formation unit and receives recording media on which images have been formed and which have been ejected;

an opening part open on the right front or left front side of said internal paper ejection unit; and a movable support that supports said document image reading device on a side surface of said document image reading device in a manner movable to a specified position by a plurality of support parts that support said document image reading device on the upper part of said internal paper ejection device having said opening part, wherein the movable support includes a support position adjustment part having an elongated hole that adjusts at least one support position where the document image reading device is supported by the plurality of support parts, wherein the support position adjustment part includes a control unit that controls at least one support position where the document image reading device is supported.

* * * * *